United States Patent [19]
Parquet et al.

[11] 4,329,845
[45] May 18, 1982

[54] AUGMENTED CHARGING SYSTEM FOR A HYDROSTATIC TRANSMISSION

[75] Inventors: Donald J. Parquet; Carl O. Pedersen, both of Burlington, Iowa

[73] Assignee: J. I. Case Company, Racine, Wis.

[21] Appl. No.: 114,903

[22] Filed: Jan. 24, 1980

[51] Int. Cl.³ .................. F15B 13/06; F16H 39/04
[52] U.S. Cl. ............................... 60/422; 60/464
[58] Field of Search ............. 60/403, 422, 378, 428, 60/430, 444, 420, 464

[56] References Cited

U.S. PATENT DOCUMENTS

| | | | |
|---|---|---|---|
| 3,212,263 | 10/1965 | Hann | 60/403 X |
| 3,952,511 | 4/1976 | Turner et al. | 60/430 |
| 3,971,215 | 7/1926 | Baron | 60/403 |
| 4,244,184 | 1/1981 | Baldauf et al. | 60/420 |

*Primary Examiner*—Irwin C. Cohen
*Attorney, Agent, or Firm*—Dressler, Goldsmith, Shore, Sutker & Milnamow, Ltd.

[57] ABSTRACT

A hydraulic fluid flow network, utilizing the fluid returned from by an open center hydraulic system, to augment the charging system of a hydrostatic transmission. The augmented charging system provides oil under pressure to flow into the charging system in the event that charging system pressure flow falls below normal. A back pressure is maintained in the return line header of an open center hydraulic system by a relief valve. Flow is diverted to the charging system by a line containing a non return valve.

5 Claims, 1 Drawing Figure

AUGMENTED CHARGING SYSTEM FOR A HYDROSTATIC TRANSMISSION

DESCRIPTION

1. Technical Field

A charging system for a closed loop hydrostatic power transmission. A valve network and method supplying an augmented supply of oil to the charging system of a hydraulically driven off-road machine.

2. Background of the Invention

In order to transmit and control power through pressurized fluids, an arrangement of interconnected components is required. Such an arrangement is commonly referred to as a hydraulic system. The number and arrangement of the components vary from system to system, depending upon the particular application. However, regardless of the arrangement of the components, all hydraulic systems contain or include certain basic components. The basic components of a hydraulic system are:

1. A reservoir;
2. A pump;
3. Interconnecting lines (pipe, tubing, flexible hoses, etc.);
4. Directional control valves; and
5. An actuating device.

The pump draws a suction on the fluid reservoir and provides a flow of fluid under pressure. This fluid is ported through a network of hydraulic lines and tubes to various control valves. The control valves direct the flow of fluid under pressure to and from the actuating device. The actuating device of a fluid power system is the component which converts fluid pressure into useful work.

There are two basic methods for joining the control valves to the actuating devices. If the directional control valves are arranged in parallel whereby system pressure acts equally on all control valves, the system is referred to as a "closed-center system."

Another system is the "open-center system." An open center system is a hydraulic system having fluid flow, but no pressure in the system when the actuating devices are idle. The pump circulates the fluid from the reservoir through the directional control valves and back to the reservoir. Like the closed-center system, the open-center system typically employs a number of subsystems with a control valve to each sub system. Unlike the closed-center system, the directional control valves of an open-center system are always connected in series with each other, an arrangement whereby the system pressure line goes through each directional control valve. In other words, fluid is always allowed free passage through each control valve and back to the reservoir until one of the control valves is positioned to operate a mechanism.

One of the advantages of an open-center system is that continuous pressurization of the hydraulic system is eliminated. Since the pressure is gradually built up after the directional control valve is moved to an operating position, there is very little shock from pressure surges. This provides for smooth operation of the actuating mechanism.

A hydrostatic transmission is often used to drive material handling machines in which a variable positive displacement hydraulic pump powers a positive displacement, hydraulic motor. Specifically, a variable displacement pump and a variable displacement (or fixed displacement) motor are joined together in a closed loop. The displacement of the tilting plate in the hydrostatic motor or pump is used to control the direction and speed of fluid flow coming from the positive displacement cylinders of the pump or motor. When the tilting plate is at right angles to the shaft and the pump is rotating, the pistons will not reciprocate; therefore, no pumping action takes place. The displacement of this type of pump is varied by changing the angle of the tilt plate.

All hydraulic systems leak to some extent. This leakage must be "made-up" so as to keep the hydraulic system in a relatively solid condition. A solid condition results in a better time response and positive control. A hydraulic system having hydraulic fluid in a partially filled condition or one having air entrained therein results in spongy operation of the control valves and actuators. In addition, there are some systems which by design maintain a constant bleed of hydraulic fluid thereby requiring continual makeup or replacement of the lost fluid. The makeup fluid is relatively cool compared to the bulk of the fluid in the hydraulic system. Thus, a "cooling effect" is produced through this continuous bleeding and feeding of hydraulic fluid. The lost oil or fluid is replaced by cooler oil supplied by a pump. This make-up oil is often called "charging oil", and the associated system is called the "charging system."

In most hydraulic systems used to operate off-road machinery, the hydraulic pumps supplying the charging system, the hydraulic pumps driving the fluid motors to move the wheels, and the hydraulic pump supplying fluid to other hydraulically powered accessories are all driven by a common shaft joined to a single internal combustion engine. There are certain situations where the hydraulic pumps can be nearly "stalled out"—a condition where leakage exceeds the output flow of the charging pump.

For example, if the machine is performing a work function (such as, loading trucks from a pile of dirt), the machine operator can "stall out" his engine by driving the material handling element (e.g. a bucket or scoop) into the pile of dirt in such a way that the bucket cannot be lifted or moved due to the excess load imposed upon it. When this happens the engine continues to run but the various hydraulic pumps joined to the engine turn over so slowly such that they cannot supply enough oil at the pressure needed. Significantly, the charging pump no longer produces an adequate amount of output flow to make-up the fluid being lost by leakage. This situation is aggravated under high temperature conditions. Hot, low viscosity oil under pressure leaks at a higher flow rate than cooler fluid pressures in the hydrostatic circuit. A supplemental oil system to supply needed make-up oil in circumstances such as these would improve the overall operation and reliability of the hydrostatic transmission system. More importantly, it would prevent equipment wear and damage.

SUMMARY OF THE INVENTION

In accordance with the present invention an augmented charging system is provided to supply make-up oil to a closed loop hydrostatic power transmission system when the normal charging system cannot produce oil at the required output pressure. In other words, the augmentation charging system supplies make-up oil under pressure when the normal charging system pump's output is exceeded by the amount of leakage.

Additional flow is provided from that portion of the hydraulic system supplying oil under pressure to the various actuating devices.

Specifically, a low pressure relief valve is used to create a back pressure condition in the common return line from the actuating devices in an open center hydraulic system. In addition, a line is used to join the return line to the charging system. A check valve installed in this latter line prevents backflow from the normal charging system supply. Charging pressure is normally higher than what the augmented charging system can provide. However, in emergencies or other unusual conditions, when an augmented supply of fluid is needed, flow from the return line will be diverted under pressure to the charging system.

DETAILED DESCRIPTION OF THE INVENTION

Figure 1:
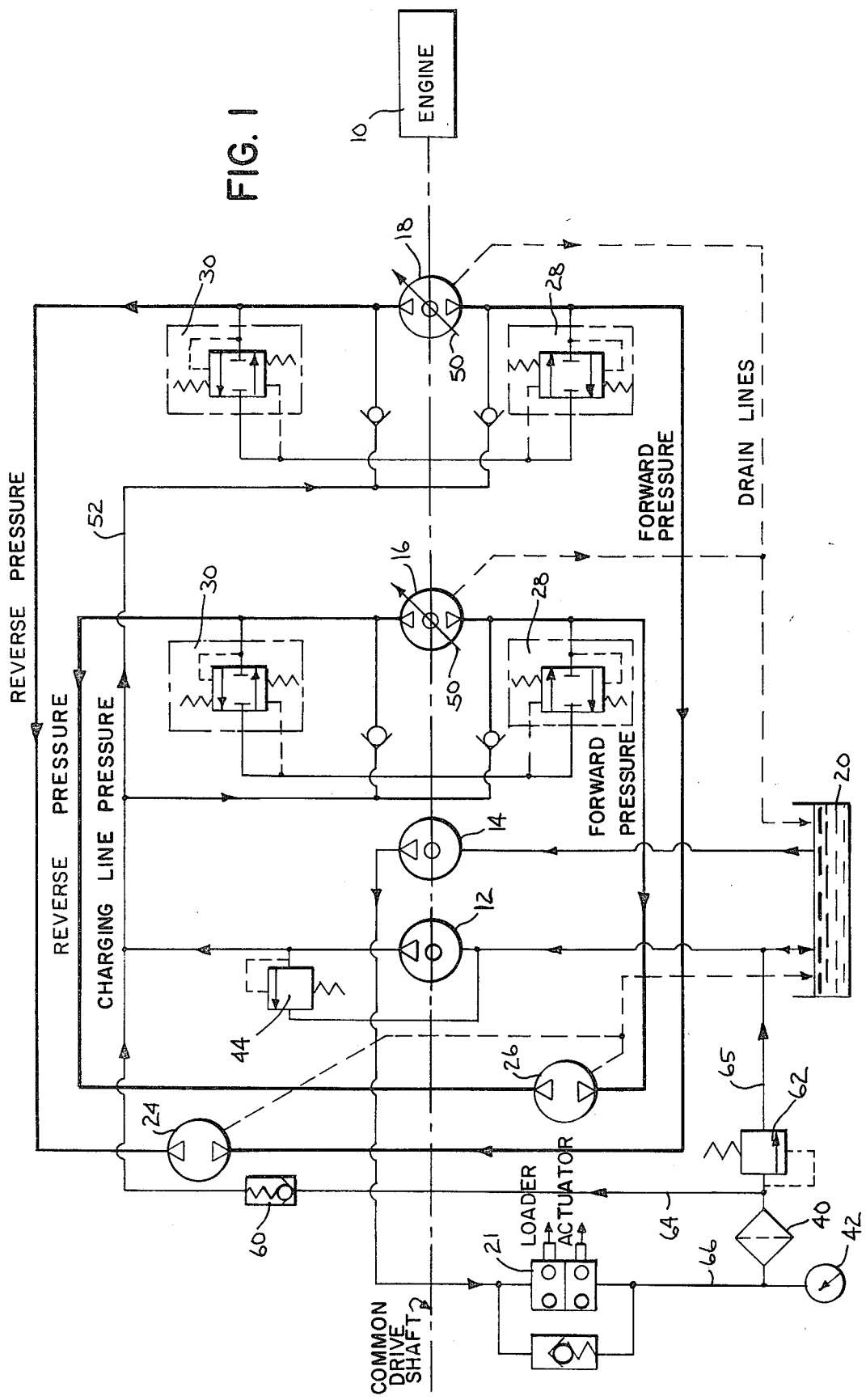
FIG. 1 is a schematic representation of an open center hydraulic system having a charging system and a closed loop hydrostatic transmission and employing the augmented charging system that is the subject of the present invention.

While this invention is susceptible of embodiment in many different forms, there is shown in these drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

FIG. 1 is a schematic drawing of a typical hydraulic system used in a small excavator or skid steer loader. This system employs an internal combustion engine 10 to drive a charging pump 12 (usually a gear pump), an equipment pump 14 (usually a gear pump), and two variable displacement pumps 16 and 18 for moving the wheels of the vehicle. Hydraulic oil is stored in a common reservoir 20. Hydraulic fluid is drawn from the reservoir 20 by the equipment pump 14 and the charging pump 12. The equipment pump 14 together with a manually actuated flow control valve 21 and the reservoir 20 define an open loop hydraulic system. The two pumps 16 and 18 supplying hydraulic fluid to the wheel motors 24 (right hand motor) and 26 (left hand motor) form a closed loop hydraulic transmission system. Oil is drawn from the reservoir 20 by each of the wheel drive pumps 16 and 18 through the charging pump 12. Relief valves 28 and 30 for each wheel pump limit the maximum safe pressure of the system in the forward and reverse directions respectively.

The four wheels are turned by two hydrostatic motors 24 and 26. One motor 24 controls the wheels on the right-hand side and another motor 26 controls the wheels on the left-hand side. A filter 40, a gauge 42, a charging line relief valve 44 and other miscellaneous components, lines and valves complete the hydraulic system shown in FIG. 1.

The hydrostatic transmission system is used to propel the machine. The position of the swash plate 50 determines the direction and speed of the wheels. The charging system maintains adequate make-up fluid flow into the low pressure side of the hydrostatic transmission. The low pressure side of the hydrostatic transmission is defined as the suction side of the pump. The high pressure side of the hydrostatic transmission is defined as the discharge of the pump. Together the high pressure side and the low pressure side comprise a closed loop. It should be kept in mind that the low pressure side of the pump is always the suction of the pump and that the suction of the pump shifts from one side of the pump to the other as the direction of the pump is changed by repositioning the swash plate.

Make-up fluid flow for leakage and other losses in the hydrostatic transmission system is supplied by the charging system. The charging pump 12 takes a supply of oil from the reservoir 20 and pressurizes or fills the charging line header 52, charging line header pressure being generally the same as low pressure side of the hydrostatic pumps. Consequently during normal operation there is a continuous flow of make-up fluid from the charging pump 12 to the closed loop hydrostatic transmission.

There are certain situations where the machine during the performance of work such as loading a pile of fill material where the machine can be "stalled out." The engine 10 runs but the engine driven hydraulic pumps 12, 14, 16, and 18 are overloaded in the sense that they are forced to produce flow at a higher than normal pressure. In particular, the charge pump 12 can be forced to turn so slowly that an adequate amount of make-up oil cannot be supplied to the low pressure side of the hydrostatic transmission. If this condition is allowed to exist for any length of time the hydraulic transmission system can be damaged. Specifically, under low pressure conditions, the piston slippers between the fixed and rotating groups within the hydrostatic transmission system lose contact. This causes unnecessary wear and deterioration. In addition certain parts of the hydraulic pump and motor (i.e. bearings) may become oil starved. Most manufacturers specify a "minimum allowable pressure" to be maintained in the low pressure side of the loop. For example, the inventors are familiar with one pump assembly having a 1.24 $in^3$/rev. flow rate and having a minimum allowable pressure of 50 psig. This pressurization requirement can be considered as analogous to, but not the same as, the requirement to maintain sufficient net positive suction head in the operation of centrifugal pumps. The present invention provides an innovative means to augment the flow of hydraulic oil to the charging system in the event that the charging pump is unable to produce the normal make-up flow at the normal supply pressure.

In the operation of an open center hydraulic system there is a continuous flow of oil from the pump 14 supplying fluid under pressure to the various control valves 21 and actuators and finally to the reservoir 20. This is a readily available supply of fluid, however it is ordinarily at too low a pressure to be used to make-up for fluid lost from the hydrostatic transmission. By maintaining a sufficient amount of "back pressure" on the return side of the hydraulic system supplying these other hydraulically actuated devices, a source of pressurized fluid is obtained that may be used to increase the amount of make-up fluid available to the charging system and to the low pressure side of the hydrostatic transmission.

Specifically, a fluid network comprising a check valve 60 or non-return valve, a back pressure regulator 62 or relief valve, and interconnecting piping 64 and 65 is added to the return line 66 of the hydraulic system previously described. In other words, the oil returning to the reservoir via the return line 66 is forced to flow through a line 64 having a check valve 60 and terminating at the charging system 52. The check valve 60 insures that if charging pressure is greater than return line pressure, charging fluid or make-up fluid is not unnecessarily wasted or lost by being bypassed directly to the reservoir.

The back pressure regulator 62 effectively regulates or controls downstream flow to the reservoir by maintaining or sensing upstream pressure. Once the pressure upstream reaches the set point of the relief valve it opens to discharge fluid to the reservoir. The back pressure regulator 62 is set so as to not hold return line pressure so high as to interfere with the operation of the hydraulic actuated equipment 21 and not so low as to maintain back pressure below the minimum allowable pressure in the low pressure side of the hydrostatic transmission. In other words, the back pressure regulator or relief valve 62 should maintain the pressure in the return side of the hydraulic system sufficiently high so as to provide a source of make-up fluid at a pressure above that required for continuous operation of the hydrostatic transmission. If the back pressure is maintained too high the "delta P" or differential pressure across the hydraulic actuators operated by the control valve 21 can be reduced to the point that the response time and performance of the associated equipment is effected during normal operation of the system. By maintaining the back pressure in the return line less than the normal pressure of the charging system, the check valve is kept seated such that return line flow continues to flow to the reservoir via the back pressure regulator.

In summary, the hydraulic network just described supplies additional oil or make-up fluid from the return side of the hydraulic system when the pressure in the charging system is lower than the pressure in the return side of the hydraulic system. In one specific skid steer loader incorporating the present invention, satisfactory performance has been obtained by using a Deccto series relief valve manufactured by Bruning Corp. with a 85 psi setpoint and a Bruning In-Line spring loaded check valve seating with a differential pressure of at least 5 psi. During emergencies or cases where the system is "stalled out" and where the charging system pump discharge pressure is reduced below normal, the augmented charging system provides a sufficient amount of pressure and flow to adequately protect the operation of the hydrostatic transmission.

From the foregoing, it will be observed that numerous variations and modifications may be effected without departing from the true spirit and scope of the novel concept of the invention. It is to be understood, that no limitation with respect to the specific apparatus illustrated is intended or should be inferred. It is, of course, intended to cover by the appended claims all such modifications as fall within the scope of the claims.

We claim:

1. In an off-road machine used in excavating operations and the like, having: a closed loop hydrostatic power transmission system to propel said machine, said transmission defining a minimum allowable operating pressure in the low pressure side of said loop; an open center hydraulic system including a pump supplying fluid under pressure to hydraulically actuated equipment; a charging system to make-up fluid lost by leakage from said transmission system including a pump means and one way check valve means opening toward said closed loop system; and a reservoir to collect said leakage and return fluid from said hydraulically actuated equipment and to supply fluid to said charging system and to said hydraulic system pump, wherein the improvement comprises: a flow control network having a check valve and a relief valve, said check valve and relief valve being located downstream of said hydraulically actuated equipment in a return line to said reservoir from said hydraulically actuated equipment, said relief valve opening in the event that said return line pressure is greater than the set point of said relief valve, said set point being generally greater than said minimum allowable operating pressure in the low pressure side of said loop and generally less than normal charging system pressure, said relief valve maintaining a back pressure on said hydraulic system return line, said check valve opening to allow flow to said charging system between said pump means and said check valve means in the event that said return line pressure is greater than the pressure in said charging system, said check valve shutting flow from said return line to said charging system in the event that charging system pressure exceeds said return line pressure thereby preventing loss of make-up fluid through said return line and said relief valve to said reservoir, whereby in the event that the pressure of said charging system is less than the pressure in said return line said check valve opens to supply make-up fluid, said check valve and said relief valve thereby augmenting said charging system.

2. In an off-road machine used in excavating operations and the like, having: a closed loop hydrostatic power transmission system to propel said machine, said transmission defining a minimum allowable operating pressure in the low pressure side of said loop; an open center hydraulic system including a pump supplying fluid under pressure to hydraulically actuated equipment; a charging system to make-up fluid lost by leakage from said transmission system including a pump means and one way check valve means opening toward said closed loop system; and a reservoir to collect said leakage and return fluid from said hydraulically actuated equipment and to supply fluid to said charging system and to said hydraulic system pump, wherein the improvement comprises: a flow control network having a pressure responsive means for directing flow in one direction and a pressure responsive valve means for regulating upstream pressure by controlling flow to said reservoir from a return line from said hydraulically actuated equipment, said means for directing flow in one direction and said valve means being located upstream of said reservoir in the return line to said reservoir from said hydraulically actuated equipment, said valve means maintaining a back pressure on said hydraulic system return line, said back pressure being generally less than normal charging system pressure and generally greater than said minimum allowable operating pressure of the low pressure side of said loop, said means for directing flow in one direction opening to allow flow to said charging system from the return line between said pump means and said check valve means in the event that said return line pressure is greater than the pressure in said charging system, said means for directing flow in one direction shutting in the event that charging system pressure exceeds said return line pressure thereby preventing loss of make-up fluid through said return line and said valve means to said reservoir, whereby in the event that the pressure of said charging system is less than the pressure in said return line said means for directing flow in one direction opens to supply make-up fluid, said means for directing flow in one direction and valve means for regulating upstream pressure by controlling flow to said reservoir from said return line thereby augmenting said charging system.

3. The off road machine defined in claim 2, wherein said means for directing flow in one direction is a spring loaded ball check valve.

4. The off road machine defined in claim 3 wherein said means for regulating upstream pressure by controlling flow to said reservoir from said return line is a relief valve, said relief valve being in a lifted condition to pass flow to said reservoir.

5. A hydraulic system for an off-road machine used for excavating operations and the like, said machine having at least one mechanical device actuated in response to hydraulic fluid pressure, comprising:

(a) a closed loop hydrostatic power transmission system to propel said machine, said transmission defining a minimum allowable operating pressure, in the low pressure side of said loop;

(b) a pump supplying fluid under pressure to said hydraulically actuated device;

(c) an open center control valve for directing said fluid to actuate said device;

(d) a charging system including a pump means and one way check valve means opening toward said closed loop system to make-up fluid lost by leakage from said transmission system;

(e) a reservoir to collect leakage and return fluid from said hydraulically actuated device and to supply fluid to said charging system and to said pump;

(f) pressure responsive first valve means for directing fluid flow in one direction; and (g) pressure responsive second valve means for controlling pressure, said first valve means and said second valve means being in circuit together in a return line to said reservoir from said hydraulically actuated device upstream of the reservoir, said second valve means maintaining a back pressure on said return line, said back pressure being generally greater than said minimum allowable operating pressure in the low pressure side of said loop and generally less than normal charging system pressure, said first valve means opening to allow flow to said charging system from said return line between said pump means and said check valve means in the event that said return line pressure is greater than said charging system pressure, said first valve means shutting in the event that charging system pressure exceeds said return line pressure thereby preventing loss of make-up fluid through said return line and said second valve means to said reservoir, whereby in the event that the pressure of said charging system is less than the pressure in said return line said first valve means opens to supply make-up fluid to said charging system, said second valve means maintaining pressure in the low pressure side of said loop, said first and second valve means thereby augmenting said charging system.

* * * * *